(12) United States Patent
Whitney et al.

(10) Patent No.: US 7,870,776 B1
(45) Date of Patent: Jan. 18, 2011

(54) CALIBRATING A SCALE WITHOUT A CALIBRATION WEIGHT BY INVERTING THE SCALE

(75) Inventors: Ryan S. Whitney, Essex Junction, VT (US); Shawn J. Stech, Georgia, VT (US)

(73) Assignee: Edlund Company, LLC, Winston-Salem, NC (US)

( * ) Notice: Subject to any disclaimer, the term of this patent is extended or adjusted under 35 U.S.C. 154(b) by 291 days.

(21) Appl. No.: 12/249,121

(22) Filed: Oct. 10, 2008

Related U.S. Application Data

(60) Provisional application No. 60/978,796, filed on Oct. 10, 2007.

(51) Int. Cl.
*G01G 23/01* (2006.01)
(52) U.S. Cl. .................... 73/1.13; 702/101; 177/50
(58) Field of Classification Search .............. 702/101, 702/102; 73/1.13, 1.15; 177/25.13, 50
See application file for complete search history.

(56) References Cited

U.S. PATENT DOCUMENTS

| | | | |
|---|---|---|---|
| 4,316,516 A | 2/1982 | Kupper | |
| 4,316,517 A | 2/1982 | Jonath | |
| 4,661,920 A | 4/1987 | Haze | |
| 4,751,661 A | 6/1988 | Amacher et al. | |
| 4,914,611 A | 4/1990 | Yamanaka et al. | |
| 4,917,199 A | 4/1990 | Loshbough | |
| 4,932,486 A * | 6/1990 | Komoto et al. | 177/50 |
| 5,726,393 A | 3/1998 | Lyga | |
| 5,832,417 A | 11/1998 | Petrucelli et al. | |
| 6,080,938 A | 6/2000 | Lutz | |
| 6,636,820 B2 * | 10/2003 | Livingston | 702/101 |
| 6,838,624 B2 * | 1/2005 | Chan | 177/50 |
| 6,995,323 B2 * | 2/2006 | Kunzi et al. | 177/25.13 |
| 7,211,746 B2 | 5/2007 | Goble | |

* cited by examiner

*Primary Examiner*—Randy W Gibson
(74) *Attorney, Agent, or Firm*—Downs Rachlin Martin PLLC

(57) ABSTRACT

A weighing scale that is calibratable without a calibration weight that is separate and distinct from the scale. The scale has a weighing mode and a self-calibration mode and includes a base that supports a load cell, which in turn supports a mass receiver. Electronic circuitry within the scale is configured so that, during the calibration mode, the sprung weight of the base when the scale is inverted and supported by the mass receiver can be used to calibrate the scale. This avoids the need to maintain a calibration weight external to the scale. A process of calibrating the scale includes inverting the scale during the self-calibration process and allowing the circuitry to acquire a calibration parameter that is based on the inverted sprung weight.

20 Claims, 7 Drawing Sheets

US 7,870,776 B1

CALIBRATING A SCALE WITHOUT A CALIBRATION WEIGHT BY INVERTING THE SCALE

RELATED APPLICATION DATA

This application claims the benefit of priority of U.S. Provisional Patent Application Ser. No. 60/978,796, filed Oct. 10, 2007, and titled Self-Calibrating Scale, which is incorporated by reference herein in its entirety.

FIELD OF THE INVENTION

The present invention generally relates to the field of weighing scales. In particular, the present invention is directed to a self-calibrating weighing scale and a method of calibrating a weighing scale.

BACKGROUND

One type of electronic weighing scale utilizes an electrically resistive strain gauge based transducer (or load cell) for determining the weight of a mass being weighed. This type of scale is used in many settings, such as the food service industry where these scales are used, for example, for portion control and for measuring ingredients of food recipes. Portion control is important to many food service organizations, such as franchised restaurants, where the portions of certain ingredients, for example, weight of meat used in a particular sandwich or weight of ice cream used in a certain size cone, provided to a customer must be tightly controlled to maintain profitability. When bakers and cooks follow carefully proportioned recipes, they clearly must use the proper amount of certain ingredients. Sometimes the ingredients can be readily measured by weight.

A load cell type electronic weighing scale generally operates by interpolating an electrical resistance signal generated by the load cell when it is placed under load. The interpolation is based upon a calibration curve created by two points of known weight and load cell response. Generally, one calibration point, the zero point, is determined by the load cell output when there is no weight placed upon the scale. The second calibration point is determined by placing an accurately known weight on the scale, often a certified weight, and measuring the load-cell resistance that results. Initial determination of these calibration points is typically done at the time of manufacture of the weighing scale.

There are a number of circumstances that can occur during the service life of a load-cell-based scale that will require the scale to be recalibrated. For example, if the scale is dropped or overloaded, the load-cell may be damaged or permanently deformed, altering its strain-resistance response. Modifications or repairs that alter the mass of scale components that rest upon or are supported by the load-cell will also require recalibration. The range of weights that a user may desire to be accurately weighed by the weighing scale may change, and improved accuracy obtained by recalibration of the scale for the exact range of interest.

SUMMARY OF THE DISCLOSURE

In one implementation, the present disclosure is directed to a weighing scale. The weighing scale includes: a mass receiver for receiving a mass to be weighed by the weighing scale; electronic circuitry configured to provide the weighing scale with a weighing mode and a self-calibration mode, the weighing mode for weighing a mass placed upon the mass receiver; a base supporting the mass receiver when the weighing scale is in the weighing mode, the base contributing to an actual inverted sprung weight of the weighing scale when the weighing scale is inverted and supported by the mass receiver; a load cell located between the mass receiver and the base and in operative communication with the electronic circuitry, the load cell configured to output a weight signal proportional to a force applied to the load cell in each of the weighing mode and the self-calibration mode; and wherein the electronic circuitry is configured to calibrate the weighing scale as a function of the actual inverted sprung weight when the electronic circuitry is in the self-calibration mode.

In another implementation, the present disclosure is directed to a method of calibrating a weighing scale. The method includes: switching a weighing scale from a weighing mode to a self-calibration mode in response to self-calibration mode signal triggered by a user; generating a weight signal for an inverted sprung weight of the weighing scale when the weighing scale is in an inverted position relative to a non-inverted position used during the weighing mode; and determining a calibration parameter value as a function of the weight signal.

In still another implementation, the present disclosure is directed to a method of calibrating a weighing scale having a weighing mode and a calibration mode. The method includes: providing the weighing scale; setting the weighing scale to the calibration mode; causing the weighing scale to obtain calibration parameters defining a first calibration point on a calibration curve when the weighing scale is in an upright orientation; inverting the weighing scale from the upright orientation to an inverted orientation; and causing the weighing scale to obtain calibration parameters defining a second calibration point on the calibration curve when the weighing scale is in the inverted orientation.

In yet another implementation, the present disclosure is directed to a method of manufacturing a weighing scale. The method includes: providing a base; providing a load cell; providing a mass receiver; providing electronic circuitry for controlling functionality of the weighing scale; assembling the base, the load cell, the weight receiver, and the electronic circuitry into the weighing scale; obtaining a value for an inverted calibration weight, wherein the value is substantially identical to, or identical to, an inverted sprung weight of the weighing scale when the weighing scale is inverted and supported by the mass receiver; and programming the value into the electronic circuitry.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
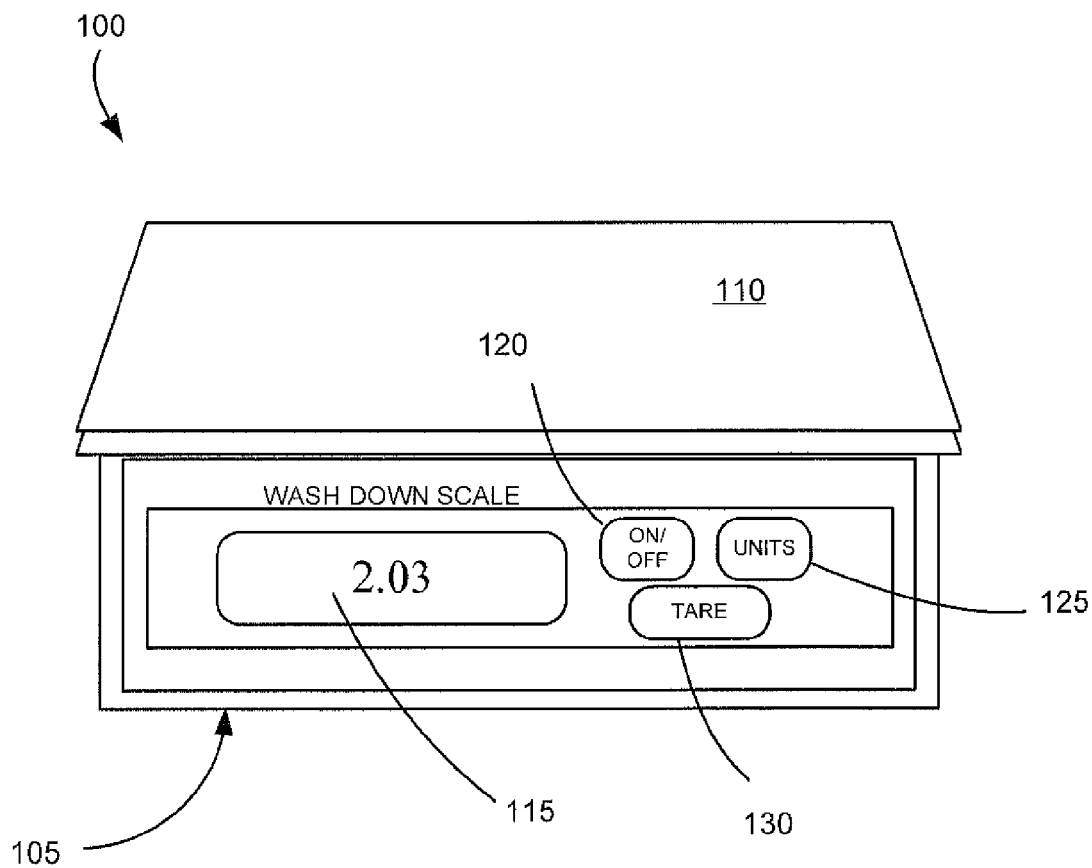
FIG. 1 is a perspective view of an example self-calibrating weighing scale made in accordance with broad concepts of the present disclosure.
Figure 2:
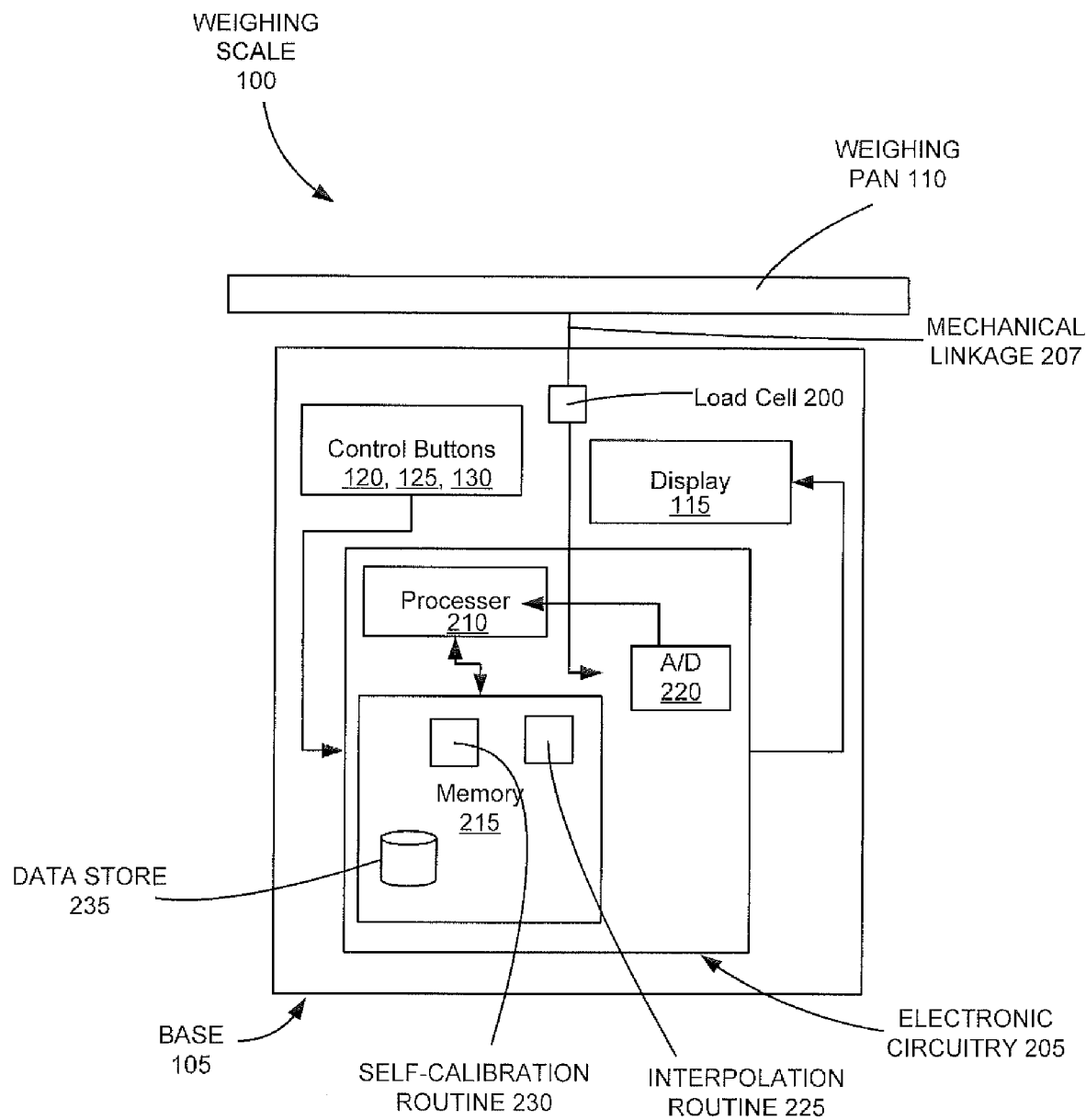
FIG. 2 is a high-level schematic diagram of the self-calibrating weighing scale of FIG. 1.

Referring now to the drawings, wherein the first digit of each element numeral therein denotes the figure number in which the corresponding element is first referenced, FIGS. 1 and 2 illustrate one embodiment of self-calibrating weighing scale 100 that implements broad concepts embodied in the present disclosure. As described in detail below, weighing scale 100 includes electronic circuitry and programmability that allow it to be self-calibrated, that is, calibrated without the use of any external calibration weights. Self-calibration procedures disclosed herein permit an end user to readily generate a new calibration curve for weighing scale 100, for example, in the event that some change or incident alters the performance or response of the scale. In this manner, scale 100 can continue to be used accurately after re-calibration, avoiding lengthy and expensive repair procedures which would likely otherwise require the scale to be shipped to a repair center.

In this example, weighing scale 100 includes a base 105 and a mass receiver, such as weighing pan 110, which rests upon a load cell 200 supported by the base. Base 105 includes electronic circuitry 205, which controls the operation and functionality of weighing scale 100. Typically, electronic circuitry 205 will include a microprocessor 210, memory 215, and an analog-to-digital (A/D) converter 220. These components, may, but need not, be integrated into a system on chip, such as an application specific integrated circuit. Broadly microprocessor 210 performs various routines and functions needed to provide scale 100 with its functionality. Memory 215 contains, among other things, the routines for performance by microprocessor 210, as well as any other information needed for the proper functioning of scale 100, such as scale settings and data needed by the microprocessor at power up. For example, memory 215 contains an interpolation routine 225, a self-calibration routine 230, and a data store 235 that contains data used in at least these routines. It is noted that while memory 215 is denoted by a single block in FIG. 2, it should be understood that the corresponding actual physical memory may be dispersed throughout circuitry 205 and in various forms, such as BIOS memory, cache memory, ROM and RAM, among others.

Base 105 also includes a display 115 and one or more buttons, here, ON/OFF button 120, UNITS button 125, and TARE button 130. Display 115 is configured to display various information to a user, such as weight, units of weight, and other information pertaining to the functionality of weighing scale 100. Each button 120, 125, 130 allows a user to select the function(s) denoted on that button, but may also be used to provide addition functionality when pressed in certain combination(s) and/or sequence(s).

When an item or other mass to be weighed (not shown) is placed on weighing pan 110, the force transmitted through the weighing pan (and any corresponding mechanical linkage 207) to load cell 200 is converted by the load cell into an analog electrical signal proportional to the weight of the mass. As is well known in the art, in a strain-gauge based load cell this occurs by deformation of one or more strain gauges (not shown), that creates changes in electrical resistance in the strain gauge(s) in an amount proportional to the deforming force. The resistance changes are sensed by circuitry (not shown) within load cell 200 that generates the analog voltage signal proportional to the resistance of the strain gauge(s) at that point in time. This analog signal from load cell 200 is input to A/D converter 220, which outputs to microprocessor 210 a certain number of digital counts corresponding to the magnitude of the input analog signal. Microprocessor 210 uses the number of counts as input to interpolation routine 225, which utilizes a current calibration curve (not shown) of weighing scale 100 as stored in data store 235. The output of interpolation routine 225 is a quantitative weight of the mass, which is displayed on a scale display 115. While the present example is directed to a strain-gauge-based load cell, in other types of load cells the force-proportional signal results from other mechanisms. For example, in a piezoelectric-element-based load cell, the load-proportional signal results from the deformation of the piezoelectric element and the resulting change in electrical characteristics of that element. Those skilled in the art will understand the different circuitry needed to adapt the broad self-calibrating concepts of the present disclosure to other types of electronic weighing scales. The term "load cell" encompasses a wide array of force-measuring devices that can generate an electronic signal proportional in a predictive manner to the force being measured. Examples include optical devices (e.g., devices that measure deflections using one or more lasers) and acoustic devices (e.g. sonar), as well as piezoelectric devices and semiconductor-based devices and more traditional resistance-type strain gauge devices, among others.

Figure 3:
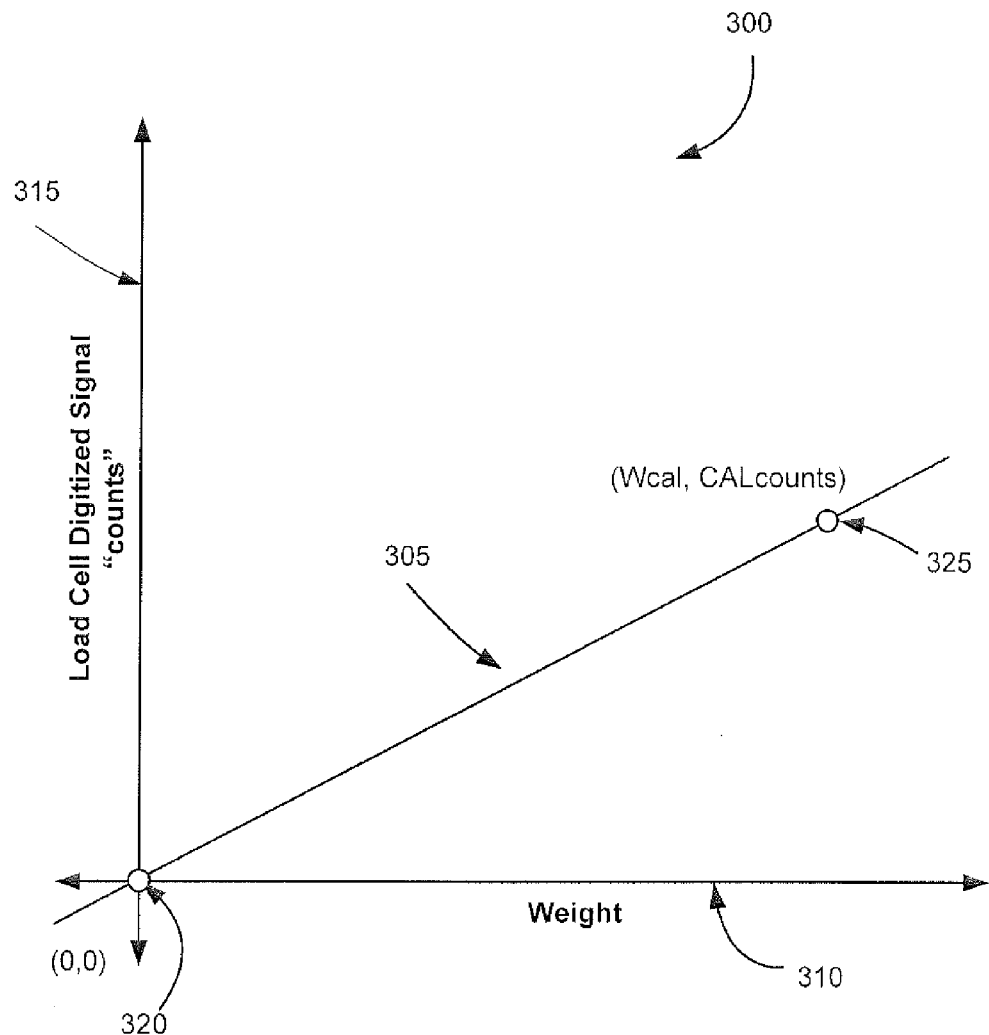
FIG. 3 is a conventional calibration curve for an electronic weighing scale.

FIG. 3 illustrates a graph 300 of a two-point calibration curve 305 for a conventional load-cell-based weighing scale (not shown). In graph 300, the horizontal axis 310 represents the weight placed on the scale, and the vertical axis 315 represents the digitized signal output by the A/D converter (not shown, but similar to A/D converter 220 of FIG. 2) that corresponds to the analog signal output by the load cell. One of the two points used to establish calibration curve 305 is a zero point 320, which represents the digitized load-cell signal when no external load is placed upon the weighing pan of the scale. A second calibration point 325 is established by placing a known certified weight ("Wcal") on the scale and associating that weight with the load-cell digital signal ("CAL-counts"). These two calibration points 320,325 define calibration curve 305. Calibration curve 305 provides the basis for an interpolation algorithm when converting a digitized load-cell output signal into a value of weight displayed on the scale.

The interplay between scale capacity, calibration weight, acceptable accuracy, and linearity of the strain-electrical resistance curve for a given load-cell, and the impact of these factors on a two-point calibration curve, are well known by those skilled in the art. Useful load-cell behavior is limited by its electro-mechanical properties and the start of inelastic deformation which can damage the load-cell and prevent repeatable performance. Total scale capacity should be less than the weight that would impose sufficient stress to initiate inelastic deformation. The calibration weight, Wcal, should be selected so that the resultant calibration curve spans a nontrivial portion of the total scale capacity. For example, Wcal may be approximately one-third of the total scale capacity. When Wcal is significantly less than the total scale capacity, extrapolation as well as interpolation may be possible with the calibration curve.

The four calibration parameters required for calibration curve 305 are the two pairs of values for first calibration point 320 and second calibration point 325. The values of the two parameters for first calibration point 320 may be obtained merely by accepting the load-cell digital output count value when no weight is placed on the scale. Ideally, this would be a zero count and a zero weight. Normally, however, the load-cell is generating an analog output signal, and thus an associated digital output count, because of the force caused by the weight of the sprung-weight, primarily the empty weighing pan and any corresponding linkage between the pan and the load cell. These can be mathematically redefined as zero count and zero weight by accounting for the weight of the weighing pan as a tare weight. The second calibration point requires knowing the digital output count (CALcounts) with a known weight Wcal. This second calibration point is conventionally established with a certified weight that is independent of the scale, and it is initially determined as part of the manufacturing process and quality control procedures. Often scale users, however, do not have a certified weight available and/or may have difficulty obtaining one.

In contrast to conventional weighing scale calibration that utilizes an external certified or other known weight, a self-calibrating process and weighing scale of the present disclosure allows a scale user to calibrate the scale without the need for any external weights. Rather, the self-calibration process utilizes the sprung weight of the weighing scale when the scale is inverted and supported by its weighing pan. As used herein and in the appended claims, this sprung weight is denoted "inverted calibration weight," and is equal to the total weight of the scale components that cause strain in the load cell when the scale is inverted and placed on a solid level surface so that the scale's base is essentially supported on the surface by the weighing pan (or pan support if the pan is removable and is removed for the inversion). An example of a self-calibrating process is described below.

Figure 4:
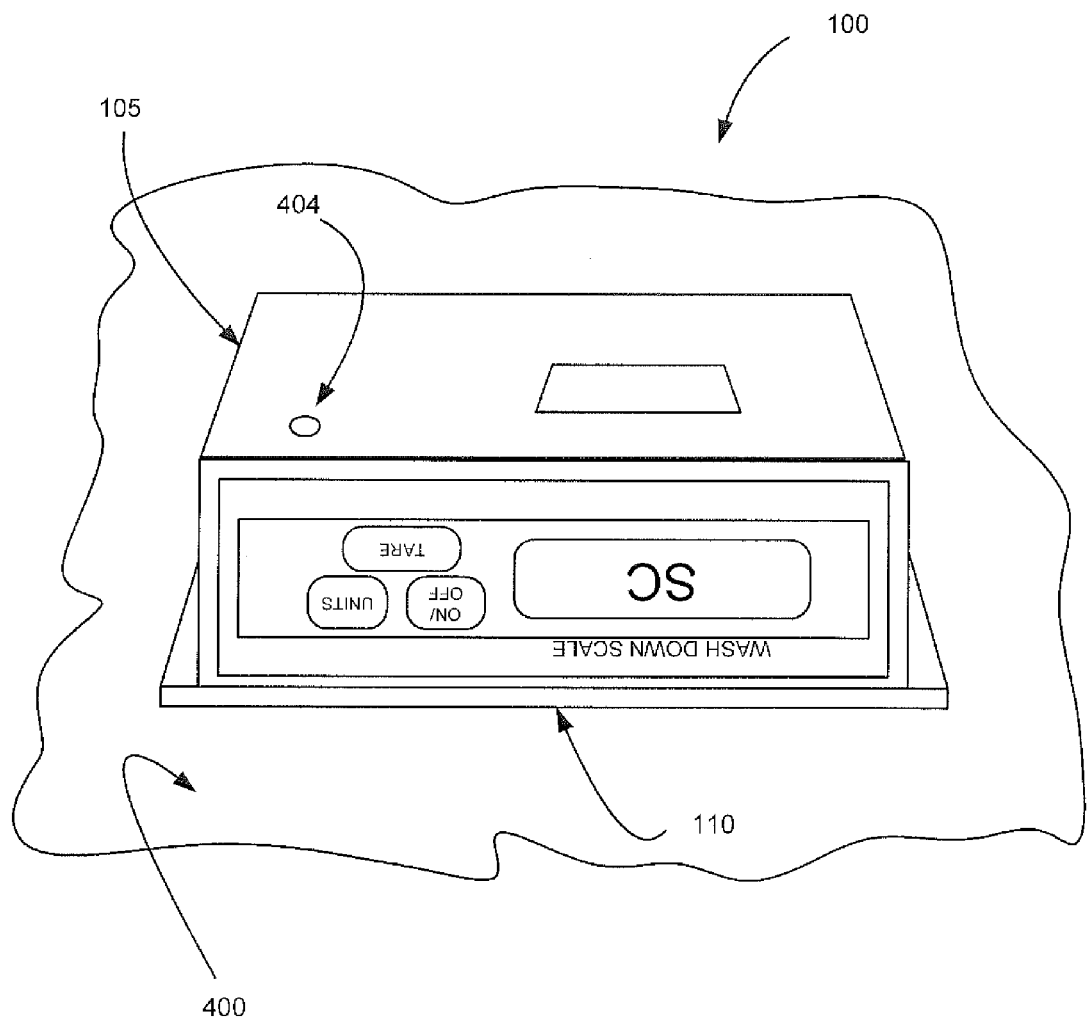
FIG. 4 is a perspective view of the self-calibrating weighing scale of FIG. 1 placed upside down in a step of self-calibration.

Referring to FIG. 4, in the context of weighing scale 100 of FIGS. 1 and 2, during the calibration process the scale is inverted, or turned upside down, and weighing pan 110 is placed on a solid level surface 400. Thus, the mass (weight) of base 105 and any sprung components of load cell 200, is supported by the load-cell when scale 100 is inverted. It is recognized that this self-calibration procedure requires that the inverted calibration weight $Wcal_{inverted}$ be accurately known to weighing scale 100, for example by programming the value into memory 215. This may be handled in any of a number of ways. For example, if the manufacturing processes used result in very little variability of the inverted calibration weight from one scale to the next, an average value of the scales' weights may be programmed into every scale. However, if there is a relatively large amount of variability in the inverted calibration weight as from one scale to another, the manufacturing process may involve adding a corrective weight to each scale as appropriate based on a weighing of that scale's base at an appropriate point in the manufacturing process. This way, all scales may be programmed with the same inverted calibration weight. As yet another example, the inverted calibration weight may be determined for each scale and that particular weight programmed into the memory of that scale. FIG. 4 also illustrates the presence of an indicator, here LED 404, that electronic circuitry 205 (FIG. 2) uses to communicate information about the status of the self-calibration mode to the user.

Figure 5:
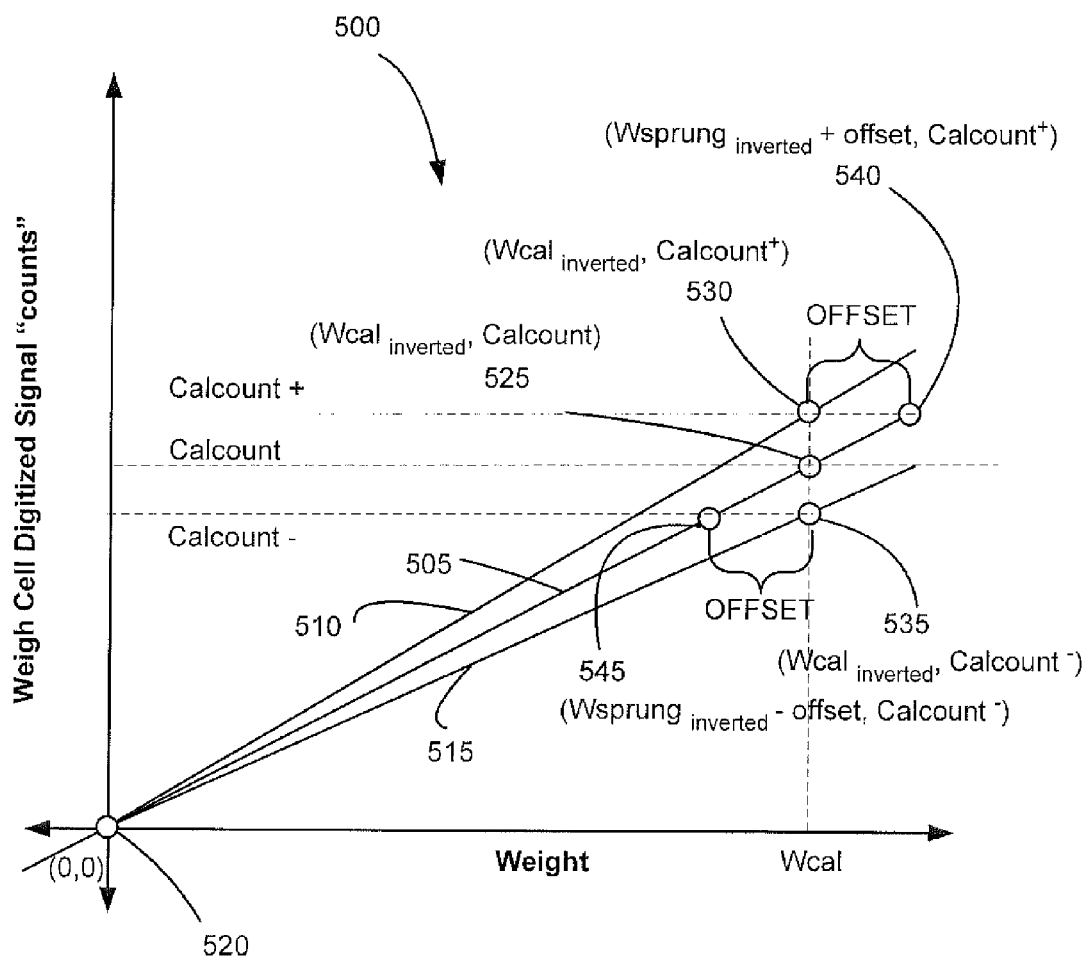
FIG. 5 is a graph of calibration curves implemented in the self-calibrating weighing scale of FIG. 1, including curves with offset corrections.

Reference should now be made to FIG. 5, which shows a graph 500 containing several calibration curves 505, 510, 515 useful in illustrating calibration functionality of a weighing scale made in accordance with broad concepts of the present disclosure. Regardless of how the inverted calibration weight is determined and programmed into weighing scale 100, the weight of a mass placed on the weighing pan of a weighing scale of the present disclosure, such as weighing pan 110 of scale 100 (FIGS. 1 and 2), is ideally determined from calibration curve 505. Since the "zero" point 520 of calibration curve 505 is truly at (0,0), the slope of this curve (which is straight line in the region of operation) is simply $Wcal_{inverted}/Calcount$. Consequently, when there is no variance in $Wcal_{inverted}$, the weight of the mass placed on weighing pan 110 is determined from the following formula:

$$\text{Weight} = \text{digital output count} \times Wcal_{inverted}/\text{Calcount} \qquad \{1\}$$

However, it is recognized that the actual sprung weight of scale 100 when it is inverted, i.e., $Wsprung_{inverted}$, is subject to variance over the service life of the scale due to wear, damage, repairs, etc. Therefore, a self-calibration process of the present disclosure can be subject to inaccuracies in obtaining the parameters of the second calibration point 525. In such cases, the value of inverted calibration weight $Wcal_{inverted}$ programmed into memory 215 (FIG. 2) may no longer be a suitable calibration weight. Consequently, the corresponding digital output count of the load-cell under influence of actual inverted sprung weight $Wsprung_{inverted}$ of scale 100 will not be equal to calibration digital count Calcount as long as the difference between actual inverted sprung weight $Wsprung_{inverted}$ and inverted calibration weight $Wcal_{inverted}$ is greater than the sensitivity of A/D converter 220. To account for such differences, the actual digital calibration count when actual inverted sprung weight $Wsprung_{inverted}$ is greater than programmed inverted calibration weight $Wcal_{inverted}$ is designated $\text{Calcounts}^+$, and the actual digital calibration count when the actual inverted sprung weight $Wsprung_{inverted}$ is less than programmed inverted calibration weight $Wcal_{inverted}$ is designated $\text{Calcounts}^-$.

If the true inverted sprung weight $Wsprung_{inverted}$ is not equal to inverted calibration weight $Wcal_{inverted}$, the calibration curve generated by a self-calibration method of the present disclosure will generate errors in the accuracy of the weight readings output by weighing scale 100. These errors are perhaps best illustrated by calibration curves 510, 515. The desired calibration curve is curve 505. However, when inverted sprung weight $Wsprung_{inverted}$ is greater than inverted calibration weight $Wcal_{inverted}$, the calibration curve used by weighing scale 100, because during the calibration process it uses the preprogrammed inverted calibration weight $Wcal_{inverted}$, is curve 510, which has a slope (with zero point being actually at (0,0)) of $Wcal_{inverted}/\text{Calcount}^+$. Consequently, the weight output by weighing scale 100 for a given mass placed upon weighing pan 110 will be determined by the formula:

$$\text{Weight} = \text{digital output count} \times Wcal_{inverted}/\text{Calcount}^+ \qquad \{2\}$$

This is so because weighing scale 100 will use point 530 in determining the calibration curve, i.e., curve 510, based on the assumed (preprogrammed) inverted calibration weight $Wcal_{inverted}$ and the actual digital count $\text{Calcount}^+$ that is based on the greater true inverted sprung weight $Wsprung_{inverted}$. Similarly, when inverted sprung weight $Wsprung_{inverted}$ is less than inverted calibration weight $Wcal_{inverted}$, the calibration curve used by weighing scale 100 is curve 515, which has a slope of $Wcal_{inverted}/\text{Calcount}^-$ and is based on the point 535. In this case, weighing scale 100 will determine the weight to output for a given mass placed upon weighing pan 110 using the following formula:

$$\text{Weight} = \text{digital output count} \times Wcal_{inverted}/\text{Calcount}^- \qquad \{3\}$$

Clearly, the weights output by weighing scale 100 based on formulas {2} and {3} above will be inaccurate, with the inaccuracy increasing with the increasing weight of the mass being weighed.

To account for these errors, a self-calibrating weighing scale, such as scale 100 of FIGS. 1 and 2, may be configured to address and overcome this problem. In one example, weighing scale 100 allows a user to enter into the scale a weight-offset value that the scale will add or subtract, as appropriate, from actual inverted sprung weight Wsprung$_{inverted}$ during the self-calibration process when the inverted sprung weight Wsprung$_{inverted}$ is known to be greater or less than preprogrammed inverted calibration weight Wcal$_{inverted}$ so that the calibration process will end up with the appropriate calibration curve, curve 505 in FIG. 5, or a curve much closer to this curve than would result without the use of the weight offset. In essence, this permits a more accurate approximation of inverted calibration weight Wcal$_{inverted}$ to be used for the second calibration point. The function of the weight offset feature is illustrated in FIG. 5.

As seen by (incorrect) calibration curve 510 in FIG. 5, when the actual inverted sprung weight Wsprunginverted is greater than preprogrammed inverted calibration weight Wcalinverted, it is necessary to adjust the inverted calibration weight Wcalinverted by a positive weight-offset value so that the point used by weighing scale 100 in determining calibration curve 505 (or the slope of this curve) is point 540, which lies on calibration curve 505 and has the coordinates (Wcalinverted+offset, Calcount+). This will have the effect of shifting the slope of calibration curve 510 back in the direction of the original and correct calibration curve 505. After weighing scale 100 has been calibrated using a positive offset value, it will essentially determine the weight to output for a given mass using the formula:

$$\text{Weight} = \text{digital output count} \times [(Wcal_{inverted} + \text{Offset})/\text{Calcount}^+] \quad \{4\}$$

Mathematically, this is equivalent to dividing the uncorrected calibration line slope by a correction factor of (Wcal$_{inverted}$ Offset)/Wcal$_{inverted}$.

Similarly, when the actual inverted sprung weight Wsprung$_{inverted}$ is less than preprogrammed inverted calibration weight Wcal$_{inverted}$, it is necessary to adjust the inverted calibration weight Wcal$_{inverted}$ by a negative weight-offset value so that the point used by weighing scale 100 in determining calibration curve 505 (or the slope of this curve) is point 545, which lies on calibration curve 505 and has the coordinates (Wcal$_{inverted}$+offset, Calcount$^+$). This will have the effect of shifting the slope of calibration curve 515 in the direction of the original and correct calibration curve 505. After weighing scale 100 has been calibrated using a negative offset value, it will essentially determine the weight to output for a given mass using the formula:

$$\text{Weight} = \text{digital output count} \times [(Wcal_{inverted} - \text{Offset})/\text{Calcount}^-] \quad \{5\}$$

Mathematically, this is equivalent to dividing the uncorrected calibration line slope by a correction factor of (Wcal$_{inverted}$ Offset)/Wcal$_{inverted}$.

As just seen, adding the appropriate offset will decrease the slope of the calibration curve, and subtracting the offset will increase the slope. If the offset is precisely equal to the difference between actual inverted sprung weight Wsprung$_{inverted}$ and the programmed inverted calibration weight Wcal$_{inverted}$, use of the offset as just described will correct the calibration curve slope exactly. The difference between actual inverted sprung weight Wsprung$_{inverted}$ and programmed inverted calibration weight Wcal$_{inverted}$ may be ascertained, at least approximately, prior to self-calibration in any suitable manner. For example, if the scale is missing a footpad, the offset may be approximately equal to the weight of a footpad, which might be attainable from the manufacturer or weighing one of the remaining footpads. In another example, if a piece is broken off of the housing, an item of estimated similar size, material, etc. can be obtained and weighed, for example, on another, properly calibrated, weighing scale.

Following is an example that should solidify the usefulness of a self-calibrating scale made in accordance with broad concepts of the present disclosure, such as scale 100 of FIGS. 1 and 2. Initially, weighing scale 100 is calibrated using a calibration weight, which in this case is inverted calibration weight Wcal$_{inverted}$, and A/D converter 220 produces a digital count of Calcount with this calibration weight. This calibration could be done either using the self-calibrating procedure or an external weight equal to inverted calibration weight Wcal$_{inverted}$. This data corresponds to second calibration point 525 on graph 500 of FIG. 5.

If, at some later time, weighing scale 100 is dropped, resulting in a nonfunctional (relative to the weighing functionality of the scale) piece of base 105 breaking off and creating some concern about the accuracy of the scale, a user may wish to recalibrate the scale. The missing piece of base 105 will not impact first calibration point 520. If load-cell 200 is undamaged or unaffected, it is presumed that the after-drop true calibration curve should be equal to original calibration curve 505.

During the self-calibration process, the new second calibration point must be determined. If weighing scale 100 is placed upside down on its weighing pan 110, inverted sprung weight Wsprung$_{inverted}$ of the scale is no longer going to be equal to inverted calibration weight Wcal$_{inverted}$ because of the missing piece of base 105. However, the self-calibration procedure presumes that the calibration weight at that stage of the procedure is still inverted calibration weight Wcal$_{inverted}$. The digital output of A/D converter 220, though, will be Calcount, reflecting the smaller digital count generated by the smaller force (i.e., actual inverted sprung weight Wsprung$_{inverted}$ that does not include the missing piece of base 105) on load-cell 200. Without correction, the calibration procedure will select point 535 (Wcal$_{inverted}$, Calcount$^-$) as the second calibration point. The scale would thus err on the low side, outputting weight values that are smaller than the actual weights being weighed.

To correct this error, a user must estimate or ascertain the actual weight change of the scale due to the broken housing. This will be the offset used to shift the second calibration point to point 545 ((Wcal$_{inverted}$−Offset)/Calcount$^-$). This places the second calibration point back onto original calibration curve 505, where it should be.

Figure 6:
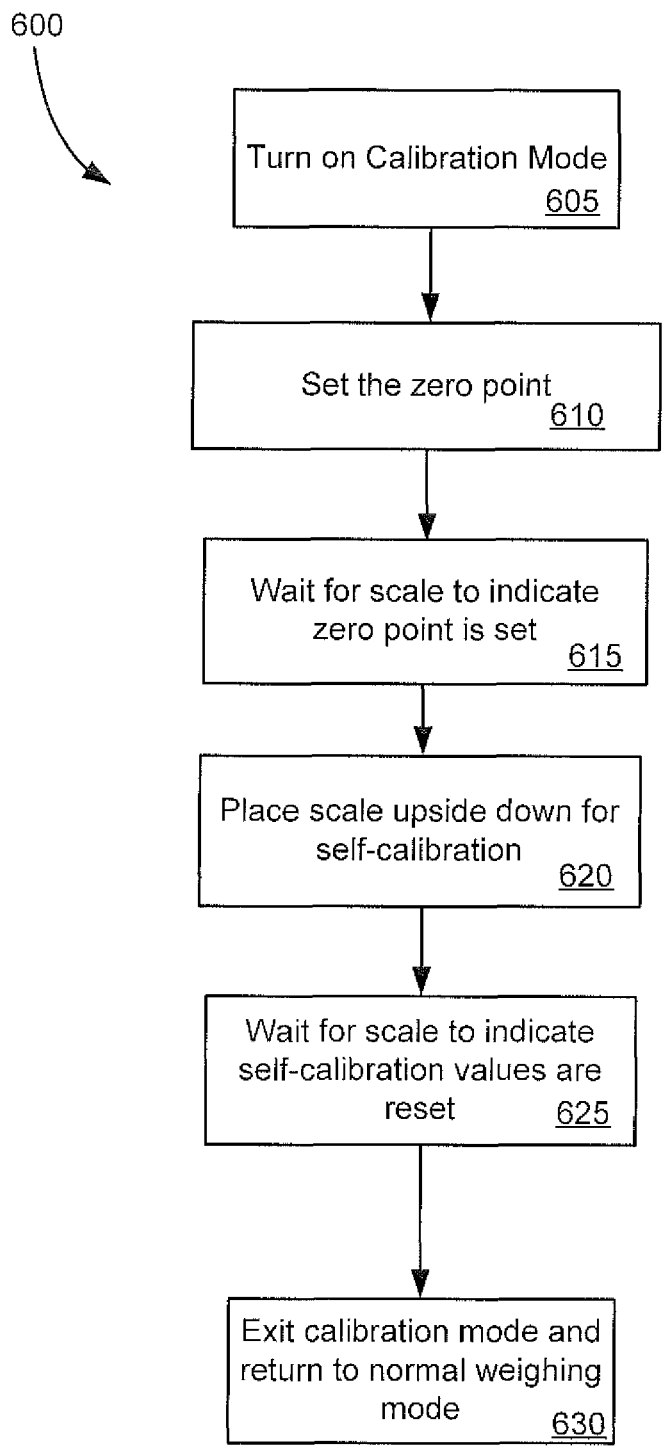
FIG. 6 is a flow diagram of a self-calibration method that can be used with a self-calibrating weighing scale of the present disclosure, such as self-calibrating weighing scale of FIG. 1.

FIG. 6 illustrates an example self-calibration method 600 that can be used to calibrate an electronic weighing scale that incorporates self-calibration capability. Weighing scale 100 of FIGS. 1 and 2 is used for illustrating self-calibration method 600 for convenience, since it has such capability. With weighing scale 100 in its normal non-inverted position, at step 605 a user places the scale into a self-calibration mode, which initiates self-calibration routine 230 stored in memory 215. This may be done in any of a number of ways, for example, by the user pushing TARE and UNITS buttons 130, 125 simultaneously with one another and then turning weighing scale 100 on with "ON/OFF" button 120. When this is done, weighing scale 100 may indicate it is in the self-calibration mode, for example, by display 115 displaying "Cal".

With weighing scale 100 still in its non-inverted position and with no external weight on weighing pan 110, at step 610 the first calibration point (here zero point 520 (FIG. 5)) is determined and set. In one embodiment, weighing scale 100 is configured to set zero point 520 in response to the user pressing TARE button 130. In this example, when weighing scale 100 has set zero point 520, the scale may be programmed so that display 115 displays "Cal 0" and LED 404 (FIG. 4) on the bottom of the scale turns on. At step 615, the user waits for weighing scale 100 to set zero point 520. Leaving the still-empty scale 100 undisturbed, self-calibration routine 230 automatically stores the parameters of zero point 520 in data store 235 of memory 215. After a predetermined period of time has passed, in this example self-calibration routine 230 causes display 115 to display "SC" to indicate weighing scale 100 has entered the part of the self-calibration routine in which the second calibration point is set. In the case, as in this example, wherein inverted sprung weight $Wsprung_{inverted}$ of weighing scale 100 is assumed to be identical to inverted calibration weight $Wcal_{inverted}$, this second calibration point corresponds to point 525 on curve 505 of FIG. 5.

At step 620, weighing scale 100 is turned over and weighing pan 110 placed face down on a firm, level surface. At this point, calibration routine 230 may be programmed so that display 115 flashes the displayed "SC" to indicate that the scale is obtaining the parameters for the second calibration point. In this case, inverted sprung weight $Wsprung_{inverted}$ of weighing scale 100 is presumed to be equal to inverted calibration weight $Wcal_{inverted}$, and the digital signal count from A/D converter 220 corresponds to the output of load cell 200 with inverted sprung weight $Wsprung_{inverted}$ suspended by the load cell. Self-calibration routine 230 may be programmed to flash LED 404 on the bottom of weighing scale 100 (that is now visible while the scale is inverted) so as to provide an accessible visual signal that the scale is self-calibrating. This flashing may occur at step 625, wherein the user waits for self-calibration routine 230 to store the parameters of the second calibration point. Self-calibration routine 230 may be further programmed to stop the flashing of LED 404 and display "Cal F" on display 115 to indicate that the self-calibration routine has captured the necessary parameters and the self-calibration is finished. At step 630, the user may cause weighing scale 100 to exit the self-calibration mode and place the scale into weighing mode. This may be done in any of a number of ways, including the user pressing "TARE" button 130. Weighing scale 100 may then be placed upright. After self-calibration method 600 has been performed, weighing scale 100 will be functioning in its weighing mode with calibration curve 505 that is based upon zero point 520 and point 525.

Figure 7:
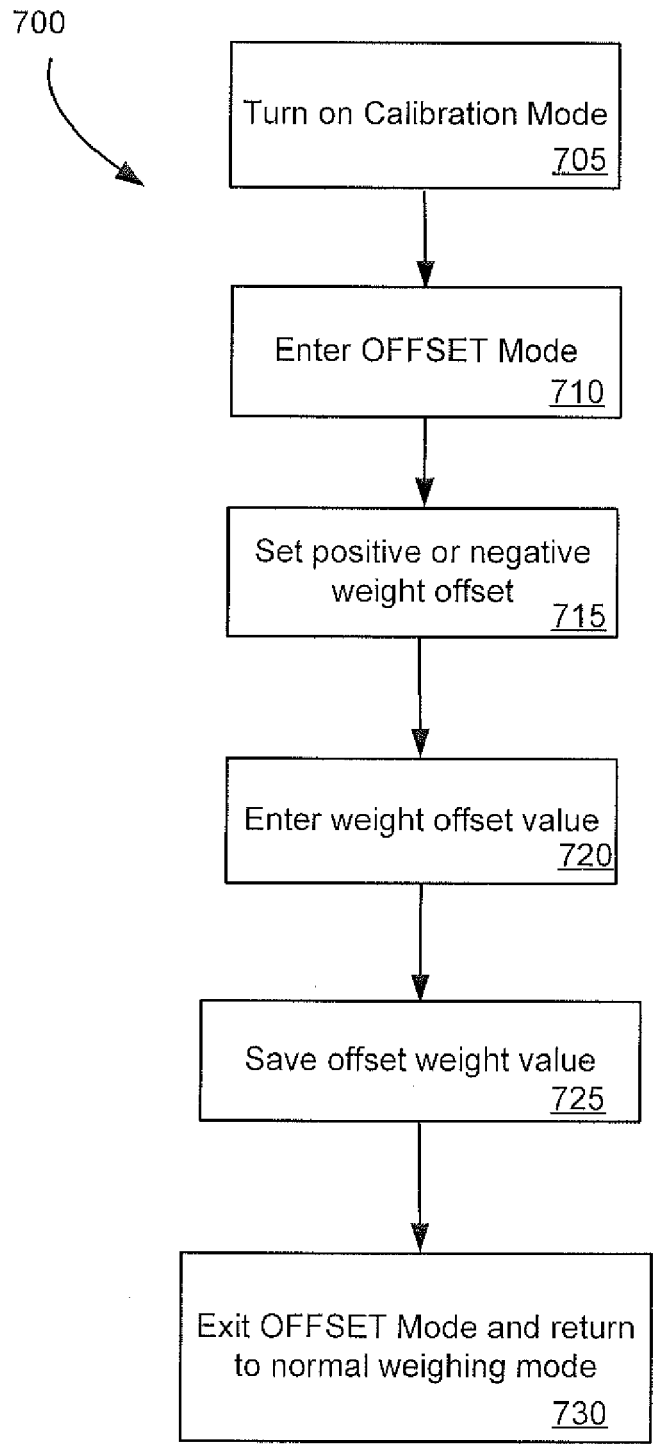
FIG. 7 is a flow diagram of a method of entering offset corrections for self-calibration that can be used with a self-calibrating weighing scale of the present disclosure, such as self-calibrating weighing scale of FIG. 1.

As discussed above, if actual inverted scale sprung weight $Wsprung_{inverted}$ is not equivalent to preprogrammed inverted calibration weight $Wcal_{inverted}$, calibration curve 505 will be incorrect. FIG. 7 illustrates an example method 700 for entering a weight correction (or "offset") to the second calibration point of the calibration curve that enables the user to essentially force, in this example, weighing scale 100 (FIGS. 1 and 2) to create a new calibration curve that more closely, or exactly, matches original calibration curve 505. In method 700, at step 705 weighing scale 100 is placed in self-calibration mode. This may be accomplished in the manner discussed relative to step 605 of self-calibration method 600 of FIG. 6, for example, by holding down TARE and UNITS buttons 130, 125 simultaneously with one another and then pushing ON/OFF button 120. Display 115 may display "Cal", as before. At step 710, the user causes weighing scale 100 to enter a weight-offset entry sub-mode, which, like other self-calibration functionality in example method 700 and example method 600 of FIG. 6, is controlled by self-calibration routine 230 stored in memory 215. In this example, the user enters the weight-offset-entry sub-mode by pressing UNITS button 125 four times in uninterrupted succession. When weighing scale 100 has successfully entered the weight-offset-entry sub-mode, in this example self-calibration routine 230 causes display 115 to change the display of "Cal" to "OFFS".

At step 715, the user chooses the sign of the weight offset. If actual inverted scale sprung weight $Wsprung_{inverted}$ is smaller than preprogrammed inverted calibration weight $Wcal_{inverted}$, for example, if a piece is missing from base 105 of weighing scale 100, the user would select a negative offset. On the other hand, if actual inverted scale sprung weight $Wsprung_{inverted}$ is greater than preprogrammed inverted calibration weight $Wcal_{inverted}$, for example, a repair has been made to base 105 using a part that is heavier than an original part it replaces, the user would select a positive offset. As discussed above in connection with FIG. 5, a negative weight offset essentially moves point 535 to the left to a location closer to, or on, calibration curve 505, such as to point 545, which precisely falls on calibration curve 505. Conversely, a positive weight offset essentially moves point 530 to the right to a location closer to, or on, calibration curve 505, such as to point 540, which precisely falls on calibration curve 505. In the current example, the sign of the offset is selected in a toggling manner by pressing TARE button 130 as needed until display 115 displays either "+0.0" or "−0.0". Those skilled in the art will recognize that there are many other ways of allowing a user to select the sign of the weight offset.

At step 720, the user sets the magnitude of the estimated or known weight-offset value. In one example, weighing scale 100 is configured so that a press of UNITS button 125 will cause display 115 to flash the left-hand side (LHS) digit, and pressing of TARE button 130 will increment the value of the LHS digit. Similarly, another press of UNITS button 125 will cause display 115 to switch the flashing digit to the right-hand-side (RHS) digit. Pushing of TARE button 130 while the RHS digit is flashing will increment the value of this digit. If one or more additional digits are provided on either side of the decimal point, the setting of such digit(s) may proceed in a similar manner, such as the digit-by-digit manner just described. Alternatively, if there is more than one digit on either side of the decimal point, those digits may be grouped together in a rolling manner, such that the least significant digit first cycles through 0-9 and then causes the next-to-least significant digit to increment, and so on. Those skilled in the art will understand that there are many other ways to input a weight value, such as through a numeric keypad, if provided.

At step 725, weighing scale 100 saves the just-inputted weight offset value and its sign. At step 730, the user causes weighing scale 100 to exit the weight-offset-entry sub-mode and place the scale back in weighing mode. In the present example, weighing scale 100 is configured to exit the weight-offset-entry sub-mode at this point in self-calibration routine 230 by a simultaneous pressing of TARE and UNITS buttons 130, 125. Weighing scale 100 is further configured in this example so that display 115 briefly displays "End" to signify the scale has left the weight-offset-entry sub-mode. After exiting the weight-offset-entry sub-mode, weighing scale 100 will then be operating with a calibration curve defined by first calibration point 520 (0,0) and a second calibration point, for example, either point 540 $((Wcal_{inverted}+Offset)/Calcount^+)$ or point 545 $((Wcal_{inverted}-Offset)/Calcount^-)$ or a point as close as practicable to these points. The weight offset value used should, of course, be chosen to make the expression (Wcal$_{inverted}$±Offset) come as close to programmed inverted calibration weight Wcal$_{inverted}$ as possible.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A weighing scale, comprising:
   a mass receiver for receiving a mass to be weighed by the weighing scale;
   electronic circuitry configured to provide the weighing scale with a weighing mode and a self-calibration mode, said weighing mode for weighing a mass placed upon said mass receiver;
   a base supporting said mass receiver when the weighing scale is in said weighing mode, said base contributing to an actual inverted sprung weight of the weighing scale when the weighing scale is inverted and supported by said mass receiver;
   a load cell located between said mass receiver and said base and in operative communication with said electronic circuitry, said load cell configured to output a weight signal proportional to a force applied to said load cell in each of said weighing mode and said self-calibration mode; and
   wherein said electronic circuitry is configured to calibrate the weighing scale as a function of the actual inverted sprung weight when said electronic circuitry is in said self-calibration mode.

2. A weighing scale according to claim 1, wherein said electronic circuitry is configured to contain a representation of an initial calibration curve that is based on the value of the actual inverted sprung weight of the weighing scale at the time of manufacture.

3. A weighing scale according to claim 2, wherein said electronic circuitry includes memory and said memory contains said representation.

4. A weighing scale according to claim 1, wherein said electronic circuitry is preprogrammed with an inverted calibration weight substantially or exactly equal to a value of the actual inverted sprung weight of the weighing scale at a time of manufacture of the weighing scale.

5. A weighing scale according to claim 4, wherein said electronic circuitry is configured to allow a user to input a weight offset value that said electronic circuitry uses to account for a difference between said inverted calibration weight and a value of the actual inverted sprung weight of the weighing scale at a second time later than the time of manufacture.

6. A weighing scale according to claim 1, wherein the weight signal is an analog signal and said electronic circuitry includes an analog-to-digital converter for converting the weight signal into digital counts.

7. A weighing scale according to claim 6, wherein said electronic circuitry is configured to calibrate the weighing scale during said calibration mode as a function of 1) a first digital counts value corresponding to the actual inverted sprung weight acquired during said calibration mode and 2) a preprogrammed inverted calibration weight programmed into said electronic circuitry.

8. A weighing scale according to claim 7, wherein said electronic circuitry is configured to determine a first calibration point having coordinates of 1) the first digital counts value and 2) a weight value that is based on said preprogrammed inverted calibration weight.

9. A weighing scale according to claim 8, wherein the weight value is equal to said preprogrammed inverted calibration weight and a weight offset entered into said electronic circuitry after said preprogrammed inverted calibration weight is programmed into said electronic circuitry.

10. A weighing scale according to claim 8, wherein said electronic circuitry is configured to determine a second calibration point having coordinates of 1) a second digital counts value corresponding to a sprung weight of said mass receiver and 2) a weight value that is based on a sprung weight of said mass receiver.

11. A weighing scale according to claim 1, wherein said electronic circuitry is configured to perform a self-calibration routine that determines a first calibration point of a calibration curve when the weighing scale is in an upright orientation and determines a second calibration point of the calibration curve when the weighing scale is inverted relative to said upright orientation.

12. A method of calibrating a weighing scale, comprising:
    switching a weighing scale from a weighing mode to a self-calibration mode in response to self-calibration mode signal triggered by a user;
    generating a weight signal for an inverted sprung weight of the weighing scale when the weighing scale is in an inverted position relative to a non-inverted position used during the weighing mode; and
    determining a calibration parameter value as a function of the weight signal.

13. A method according to claim 12, wherein said determining of the calibration parameter value includes digitizing the weight signal so as to obtain a first digital counts value.

14. A method according to claim 13, further comprising determining a first calibration point having coordinates of 1) the first digital counts value and 2) a weight value that is based on a preprogrammed inverted calibration weight.

15. A method according to claim 14, further comprising receiving a weight offset value that compensates for a difference between the inverted sprung weight and the preprogrammed inverted calibration weight, wherein the weight value is equal to said preprogrammed inverted calibration weight and the weight offset.

16. A method according to claim 13, further comprising determining a second calibration point having coordinates of 1) a second digital counts value corresponding to a sprung weight of a mass receiver of the weighing scale and 2) a weight value that is based on a sprung weight of said mass receiver.

17. A method according to claim 12, further comprising determining a first calibration point of a calibration curve when the weighing scale is in an upright orientation and determining a second calibration point of the calibration curve when the weighing scale is inverted relative to said upright orientation.

18. A method of calibrating a weighing scale having a weighing mode and a calibration mode, comprising:
    providing the weighing scale;
    setting the weighing scale to the calibration mode;
    causing the weighing scale to obtain calibration parameters defining a first calibration point on a calibration curve when the weighing scale is in an upright orientation;

inverting the weighing scale from the upright orientation to an inverted orientation; and causing the weighing scale to obtain calibration parameters defining a second calibration point on the calibration curve when the weighing scale is in the inverted orientation.

19. A method according to claim 18, further comprising entering a weight-offset value into the weighing scale, wherein said causing of the weighing scale to obtain calibration parameters defining a second calibration point includes causing the weighing scale to obtain calibration parameters defining a second calibration point on the calibration curve as a function of the weight-offset value.

20. A method of manufacturing a weighing scale, comprising:

providing a base;

providing a load cell;

providing a mass receiver;

providing electronic circuitry for controlling functionality of the weighing scale;

assembling the base, the load cell, the weight receiver, and the electronic circuitry into the weighing scale;

obtaining a value for an inverted calibration weight, wherein the value is substantially identical to, or identical to, an inverted sprung weight of the weighing scale when the weighing scale is inverted and supported by the mass receiver; and programming the value into the electronic circuitry.

* * * * *